United States Patent
Elder et al.

(10) Patent No.: US 7,047,377 B2
(45) Date of Patent: May 16, 2006

(54) SYSTEM AND METHOD FOR CONDUCTING AN AUCTION-BASED RANKING OF SEARCH RESULTS ON A COMPUTER NETWORK

(75) Inventors: Kevin Elder, Las Vegas, NV (US); Oliver Hemmers, Las Vegas, NV (US)

(73) Assignee: Gruintine Pueche, Inc., Las Vegas, NV (US)

( * ) Notice: Subject to any disclaimer, the term of this patent is extended or adjusted under 35 U.S.C. 154(b) by 0 days.

(21) Appl. No.: 10/225,103

(22) Filed: Aug. 20, 2002

(65) Prior Publication Data

US 2004/0039889 A1 Feb. 26, 2004

(51) Int. Cl.
*G06F 12/08* (2006.01)
(52) U.S. Cl. ........................ 711/162; 711/161; 707/204
(58) Field of Classification Search ................ 711/161, 711/162
See application file for complete search history.

(56) References Cited

U.S. PATENT DOCUMENTS

| | | | |
|---|---|---|---|
| 4,347,563 A | 8/1982 | Paredes et al. |
| 4,351,023 A | 9/1982 | Richer |
| 4,507,751 A | 3/1985 | Gawlick et al. |
| 4,710,870 A | 12/1987 | Blackwell et al. |
| 4,751,702 A | 6/1988 | Beier et al. |
| 4,958,270 A | 9/1990 | McLaughlin et al. |
| 5,060,185 A | 10/1991 | Naito et al. |
| 5,086,502 A | 2/1992 | Malcolm |
| 5,133,065 A | 7/1992 | Cheffetz et al. |
| 5,212,784 A | 5/1993 | Sparks |
| 5,276,860 A | 1/1994 | Fortier et al. |
| 5,454,099 A | 9/1995 | Myers et al. |
| 5,495,607 A | 2/1996 | Pisello et al. |
| 5,513,314 A | 4/1996 | Kandasamy et al. |
| 5,544,347 A | 8/1996 | Yanai et al. |
| 5,559,991 A | 9/1996 | Kanfi |
| 5,634,052 A | 5/1997 | Morris |
| 5,638,509 A | 6/1997 | Dunphy et al. |
| 5,680,640 A | 10/1997 | Ofek et al. |
| 5,742,792 A | 4/1998 | Yanai et al. |
| 5,799,141 A | 8/1998 | Galipeau et al. |
| 5,933,653 A | 8/1999 | Ofek |

(Continued)

*Primary Examiner*—Mano Padmanabhan
*Assistant Examiner*—Midys Rojas
(74) *Attorney, Agent, or Firm*—Blakely, Sokoloff, Taylor & Zafman LLP

(57) ABSTRACT

A flexible data transfer and data synchronization system is described. Local and geographically remote systems comprise a data processing network. Each remote and local system includes a data storage facility. The local system backs up, mirrors and/or synchronizes its data to one or several geographically remote systems. During normal operation the data is transferred between the local system and remote systems in an asynchronous manner. According to one aspect of the invention, should the local system be out of synchronization for any reason with the geographically remote system the two systems will automatically re-synchronize without interruption to local or remote system users. This includes the initial data transfer between the local and geographically remote system. Embodiments of the invention are based on the interception and queuing of file system events as they occur, rather than the interception and transmittal of actual data disk writes. In this way, embodiments of the invention it does not require temporary storage of the physical data disk writes themselves in a separate, possibly volatile buffer system.

19 Claims, 9 Drawing Sheets

U.S. PATENT DOCUMENTS

| | | | |
|---|---|---|---|
| 6,029,231 A | 2/2000 | Blumenau | |
| 6,173,377 B1 | 1/2001 | Yanai et al. | |
| 6,188,695 B1 | 2/2001 | Przybysz | |
| 6,463,513 B1 * | 10/2002 | Bish et al. | 711/161 |
| 6,798,743 B1 * | 9/2004 | Ma et al. | 370/235 |
| 2003/0115433 A1 * | 6/2003 | Kodama | 711/162 |
| 2003/0126387 A1 * | 7/2003 | Watanabe | 711/161 |
| 2003/0200431 A1 * | 10/2003 | Stirbu | 713/168 |

* cited by examiner

Configuration File —100

101 —Partition = hdb1

102 —Partners = 24.168.3.165;24.234.53.86;64.53.206.81

103 —Auth_string = aqo9FG83kdDeefFgDFqwertystring

104 —Exclude_dir = /proc;/dev;/etc

105 —Notify= sysadmin@gpix-os.com

106 —Mail_server =

107 —Logfiles =

108 —Receive = yes

109 —Send = yes

110 —Allowed_clients = 24.168.3.165;24.234.53.86;64.53.206.81

111 —Protocol = tcp

112 —Compress = yes

113 —Threads = 5

114 —Prioritization = yes

Fig. 1

SYSTEM AND METHOD FOR CONDUCTING AN AUCTION-BASED RANKING OF SEARCH RESULTS ON A COMPUTER NETWORK

BACKGROUND

1. Field of Invention

Embodiments of this invention relate to digital data processing systems. Specifically, it relates to a method or apparatus for transferring data through mirroring, backup and synchronization between local and geographically remote data storage facilities.

2. Background

In general, users of data processing computer systems are concerned about the protection of their data. Local and remote backup systems serve as a means for this protection should the data be lost, damaged or destroyed. Currently, many companies maintain these backup copies of their valuable data onsite on neither removable data storage devices or on secondary local data storage systems to which the data has been mirrored.

One known technique requires a computer system being taken out of service while tape backups are made. It is a requirement that these tapes are to be taken off the premises for a safe geographically remote storage of an organization's critical data. Should there be a requirement for the restoration of data to the local system, the tapes need to be retrieved from their remote location and restored to the host system. This process is very time consuming and costly not just because of the number of tapes and personnel involved, but also due to the long time delay in which the local system is inaccessible to the users.

The need for geographically remote data backup is ever increasing to prevent non-recoverable catastrophic loss of valuable data on the local system, and of any backups that may be stored at the same location.

Current real time geographically remote backup and mirroring services require a high-speed dedicated network connection between the sending and receiving systems, such as a fiber-optic connection. This is due to the fact that current mirroring systems need to communicate between the local and remote systems at data transfer rates that are capable of staying within one read or one write request on the local and remote systems. This means, that these systems require the raw data to be transferred in the exact same sequence and speed as it is read or written to disk on both systems. A read or write operation is not considered to be complete as a whole until both the local and the remote systems have completed their respective operations singularly. If the data transfer rate drops below the required speed between the local and remote systems, both systems get out of synchronization with each other rendering the local and remote systems unusable.

Mirroring data between one local host and several geographically remote systems would require as many high speed dedicated fiber-optic connections based on the fact that existing technologies attempt to transfer data at the speed of the local bus of the participating data processing systems. The absence of large memory buffers requires that the network connection speed is as fast or faster than the local bus speed. Therefore, many fiber-optic connections are limited to metropolitan area networks between buildings. State wide, interstate wide or intercontinental data mirroring is therefore unfeasible for most potential users with current technology.

Another technique requires additional special purpose hardware such as additional storage devices that are dedicated to queuing raw data as it is written to disk. These additional storage devices act as a memory buffer that maintains the sequence of the raw data disk writes. The raw data will then be transmitted in the exact sequence, as it is stored in the memory buffer. This is an attempt to adopt a high-speed internal data bus transfer rate to a slower network data transfer rate. While this technique alleviates the need for a dedicated fiber-optic network connection, it still requires a very fast network connection to prevent the system from running out of disk space and a potential buffer overflow condition, which once again would render the systems unusable. This method also does not allow for any prioritization of raw data transfers between the local and remote systems, as they must occur in the exact same sequence as they did on the originating system.

In addition, software based solutions to data mirroring such as described in U.S. Pat. No. 5,799,141 are overly complex and very inflexible in nature. It is a requirement to explicitly name the files that are to be mirrored, in a configuration database. These systems can only synchronize specific files between the local and remote systems. If a user of such a system requires the synchronization of additional files, the mirroring process must be shutdown and the path to the new files that are to be mirrored must be added to the configuration database at the local system and the remote system. There is also an additional burden to the file system of the local machine in that each time a file is written to, the name of the file must be looked up and matched against the configuration database. This has an obvious side effect in that, as the size of the configuration database grows, it will inherently slow down the file system. Once again, potentially rendering the system technically unusable.

This method also has the limitation of not automatically mirroring newly created files or directories without changes to the configuration database by the system user. The system can only mirror changes to already existing files and can't mirror complete directory structures or hard drive volumes. Furthermore, it still does not alleviate the need to queue the actual raw disk data itself thus creating large queue files, which again, require fast network connections.

SUMMARY OF THE INVENTION

A flexible data transfer and data synchronization system is described. Local and geographically remote systems comprise a data processing network. Each remote and local system includes a data storage facility. The local system backs up, mirrors and/or synchronizes its data to one or several geographically remote systems. During normal operation the data is transferred between the local system and remote systems in an asynchronous manner. According to one aspect of the invention, should the local system be out of synchronization for any reason with the geographically remote system the two systems will automatically re-synchronize without interruption to local or remote system users. This includes the initial data transfer between the local and geographically remote system. Embodiments of the invention are based on the interception and queuing of file system events as they occur, rather than the interception and transmittal of actual data disk writes. In this way, embodiments of the invention do not require temporary storage of the physical data disk writes themselves in a separate, possibly volatile buffer system.

BRIEF DESCRIPTION OF THE DRAWINGS

The invention may best be understood by referring to the following description and accompanying drawings that are used to illustrate embodiments of the invention. In the drawings:

FIG. 1 is a listing of a configuration file containing the information required by the mirroring process to function according to one embodiment of the invention;

DETAILED DESCRIPTION OF PREFERRED EMBODIMENTS

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

The following describes the embodiments of the flexible remote data transfer software in accordance with the present invention. The flexible remote data transfer software of the embodiments of the present invention provides a coherent copy of data on a local data storage system to one or several other local or geographically remote data storage systems. The data mirroring/transfer can occur one directional, or omni-directional, between all data storage systems involved in this network, for the purpose of data access at all locations and disaster recovery in case of data loss on one or several data storage systems. The flexible remote data transfer software in accordance with the present invention is designed to mirror/transfer data between local and geographically remote data storage systems across any available network connection. Furthermore, embodiments of the current invention provide remote data synchronization without special hardware configurations or the need for an expensive high-speed network.

Figure 2:
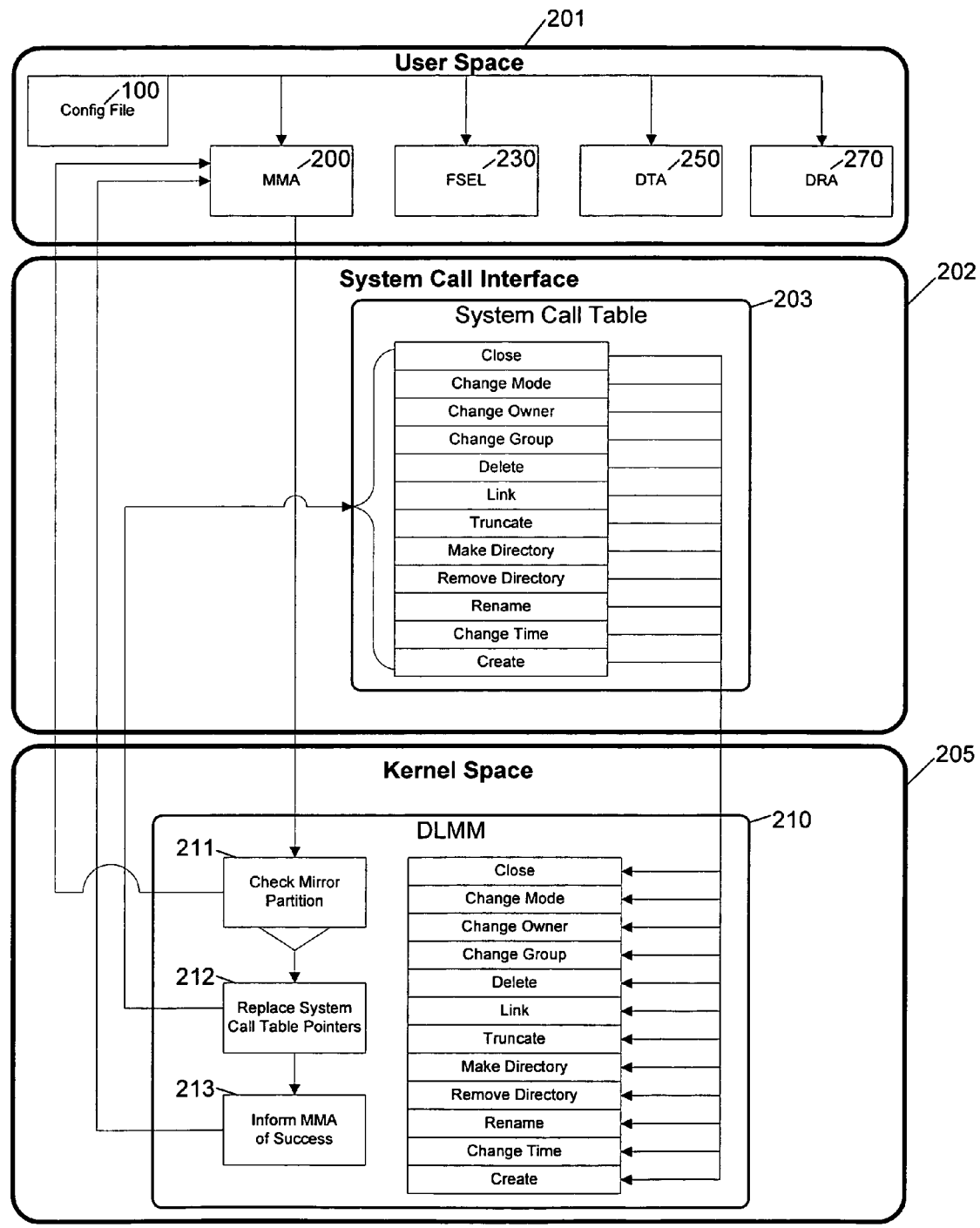
FIG. 2 is a block diagram describing the loading and replacement of the system calls by the DLMM according to one embodiment of the invention.

To help facilitate an understanding of the method of operation of embodiments of the invention, the following will describe the invention as it pertains to mirroring/transferring data between two standard PC's using an Unix-like operating system. Specifically, an embodiment of the present invention achieves synchronization through software and logical operations alone and is comprised of a Mirroring Manager Agent (MMA) 200, a Dynamically Loadable Mirroring Module (DLMM) 210, a File System Event Logger (FSEL) 230, a Data Transfer Agent (DTA) 250, and a Data Receive Agent (DRA) 270, as shown in FIG. 2.

In one embodiment, these logical parts are grouped into a File System Event Logging Procedure and a Data Transfer and Synchronization Procedure.

The file system logging procedure is comprised of the dynamically loadable mirroring module (DLMM) 210, which resides as a privileged mode device driver in the kernel 205 and a file system event logger (FSEL) 230, a protected mode daemon residing in user space 201.

Figure 4:
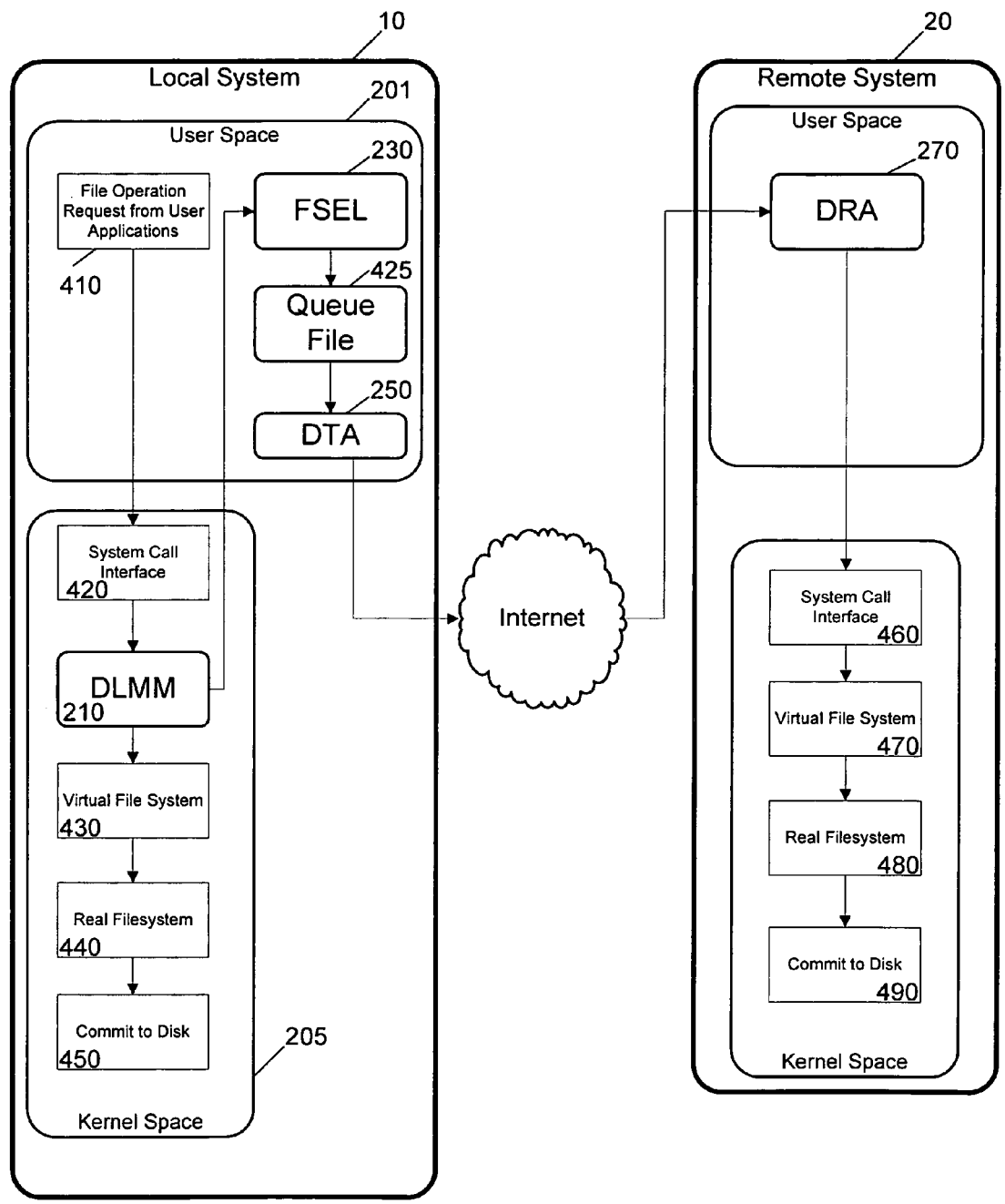
FIG. 4 is a block diagram of an overview of the data mirroring system of embodiment of the invention.

As shown in FIG. 4, when loaded, the mirroring module 210 resides between the system call interface 420 and the virtual file system 430. The DLMM 210 mirroring module reroutes certain file system operation events 410 through its own facilities inspecting these events as they pertain to specific file operations. If a file system event is deemed to be of interest, the event is logged along with the name of the file in which the event was enacted upon and is sent to the FSEL 230 daemon. This daemon commits the information received by the mirroring module to a queue file 425 that resides on the local hard disk 450.

The Data Transfer and Synchronization Procedure is comprised of the Data Transfer Agent (DTA) 250 and the Data Receive Agent (DRA) 270 both being protected mode daemons. The DTA 250 operates on the local machine in user space 201 and the DRA 270 operates on the remote machine in user space.

The DTA 250 awaits information to be written to the file system event log queue file 425. When such information becomes available in the queue, the DTA 250, in one embodiment, seizes the queue 425 and renames it, thus allowing for the creation of a new queue file by the FSEL 230. This action effectively separates the two main procedures from each other, thus enabling them to operate entirely on their own accord. Through this separation, the information stored in the queue file 425 can then be manipulated and optimized in various ways prior to the transfer of data to the DRA 250 running on the remote system.

In one embodiment, the information stored in the queue file is also prioritized. Once the prioritization of the queue file 425 is complete, other optimization techniques may be used as they pertain to the transfer of data from the local system to the remote system. These techniques would include but certainly not limited to, the use of multiple communications threads that allow the use of the entire bandwidth available to the system, or adjust for faulty and congested network communications by rerouting the data across different networks among other examples. It also allows for easily sharing information between multiple mirrored partners, thus providing a high degree of flexibility.

Once the DTA 250 has control of the queue file 425, the DTA 250 connects to the DRA 270 of the remote data storage system and begins the mirroring or synchronization process.

It should be understood that in one embodiment, the invention achieves a stable asynchronous method by queuing the file system events as they occur, and not trying to queue the raw data as it is written to disk. This method gives this embodiment of the invention the capability of being able to look at what occurred within the file system, verses what was written to a file. In this way, there is no need to queue raw data to a separate location or queue when the data already exists within the file that was changed. Once a file or directory has been altered, the file system event along with the path to the file or directory is the only information that is required to facilitate the mirroring process.

It should also be understood that due to the complete separation of the two main procedures and the fact that only file system events are queued the system can adjust for various synchronization or data integrity errors. Lost data or directory trees that one system may loose during a power outage or disk write error can be re-synchronized on the fly. The remote computer system can also automatically synchronize the data storage devices during initial installation or in the event that a storage device has to be replaced. If data becomes corrupted during the transfer, it is a simple task to resend the data. All this can happen without interruption to the ongoing or current mirroring process and does not require user interaction.

In one embodiment, the mirroring process begins by the invocation of the Mirroring Manager Agent (MMA) 200. The MMA 200 parses out the mirroring configuration information stored in a configuration file 100, as shown in FIG. 1, depending on which operating system is used by the data storage system.

In one embodiment, the configuration information includes partition 101, a partner 102, and auth_string 103 attributes.

The Partition 101 attribute describes the disk partition to be mirrored. This can be a single partition or the entire system for the complete duplication of all data contained in the computer.

The Partners 102 attribute configures the mirroring partners network locations and logical network addresses. It should be understood that the system is not limited to any particular network protocol. The logical network address is protocol dependent. The appropriate information will then be added to the configuration file. These can be multiple entries using a semi-colon delimited format.

The auth_string 103 attribute is an authentication string that is shared between mirrored partners such as servers and clients. In one embodiment, the auth_string 103 is passed on during the connection establishment process and is identical on all sides or the receiving unit will terminate the connection abruptly leaving the client of the connecting side in an unstable state. This auth_string 103 may be set by the system administrator and can be of any size. In one embodiment, the authentication string 103 attribute is used for security purposes to validate the sending clients.

Additional attributes of the configuration file 100 include an exclude_dir 104, a notify 105, a mail_server 106, log files 107, a receive 108, a send 109, an allowed_clients 110, a protocol 111, a compress 112, a threads 113, and a prioritization 114.

The exclude_dir 104 is a semi-colon separated string that lists the directories that should not be mirrored along with any files that reside underneath said directories.

The notify 105 attribute is an e-mail address of a nominated person who is notified in case of an error.

The Mail-server 106 attribute is an address of an accessible email server for error notification.

The Logfiles 107 attribute configures an alternate location of the log files that are generated by the mirroring daemons or processes. This must be a full path. If this field is empty the mirroring daemons or processes will use the default location.

The Receive 108 attribute specifies if the system is to receive data.

The Send 109 attribute specifies if the system is to send data.

The allowed-clients 110 logical network addresses of acceptable clients (Network logical address filter).

The Protocol 111 is the Network Transport Protocol to use.

The Compress 112 attribute specifies if the data should be compressed prior to transmission.

The Threads 113 attribute maximum number of allowed threads.

The Prioritization 114 attribute specifies if the queue file should be prioritized.

It should be understood that a configuration file 100 shows one example of a configuration file used to store the configuration information, however, in alternative embodiments, configuration type repositories well known to those of ordinary skill in the art such as, a system data base or system registry, among other examples, dependent on the operating system in use.

If the configuration information suggests that only a single disk partition should be mirrored (e.g. partition=hdb1), the MMA 200 checks to see if the specified partition is accessible and mounted by looking up the information in the /proc/mounts file or in the system registry or data base. If the specified partition cannot be accessed by the MMA 200 an error message is generated and sent to the system logger daemon or process and is then sent to the email address listed in the configuration file 100. If the entry in the configuration is partition=ALL for the partition 101 attribute, then the entire system will be mirrored except for the directories that are listed in the optional Exclude_dir 104 entry if any are listed.

Once the MMA 200 is successful with the parsing and verification of the stored configuration information it loads the Dynamically Loadable Mirroring Module (DLMM) 210 using an operating dependent facility as shown in FIG. 2.

The first step the DLMM 210 performs that allows the facilitation of the mirroring process is to reassign or otherwise change (212) the values of the variables inside the system call table array 203. The system call table array 203 is used to store the addresses of all system call functions and resides in the kernel 205 at run time. Each element of the system call table array 203 is a pointer to a location in memory corresponding to a particular system call function. By changing the values stored in the elements of the system call table array 203, we can effectively reroute certain file operations through the DLMM 210. The new values in the system call table array point to the location in memory of the DLMM's version of certain file operation functions. The name of the file-operation functions vary depending upon the operating system in use but relate to the following procedures: Close, Create, Change of user ownership, Change of Access permissions, Change of group ownership, Delete, Symbolic Link (If the operating system has this ability), Hard Link (If the operating system has this ability), Rename, Truncate, Change of Time attributes, Make Directory, and Remove Directory.

As file operation requests from user space 201 applications traverse down the various subsystems and functions that make up the file system, they eventually arrive at the system call table array 210. If the file operation request happens to be one of the above listed system call functions, the request is sent to the DLMM 210. Every file in a computer has an associated inode that stores statistical information about the file. The file-operation functions within the DLMM 210 have the ability to inspect the inode that represents the enacted upon file and make decisions based upon the information stored therein.

The MMA 200 is informed of the successful replacement of the file-operation functions (213) in the system-call table array via a callback function or through the use of a signal interrupt in an asynchronous fashion. The exact method used to inform the MMA 200 depends upon the operating system in use. If the replacement of the file operation functions fails, the MMA 200 is also notified of this fact using the above-described method. If the replacement of the file-operation functions in the system-call interface of the file-system is deemed to be successful, the MMA 200 loads the needed configuration information into the DLMM 210 via input/output control function calls (ioctl).

In one embodiment, the DLMM 210 requires only the configuration information of the device to be mirrored for nominal operations. For example, this would be the information stored in the partition field of the configuration file 100, as shown in FIG. 1.

Figure 3:
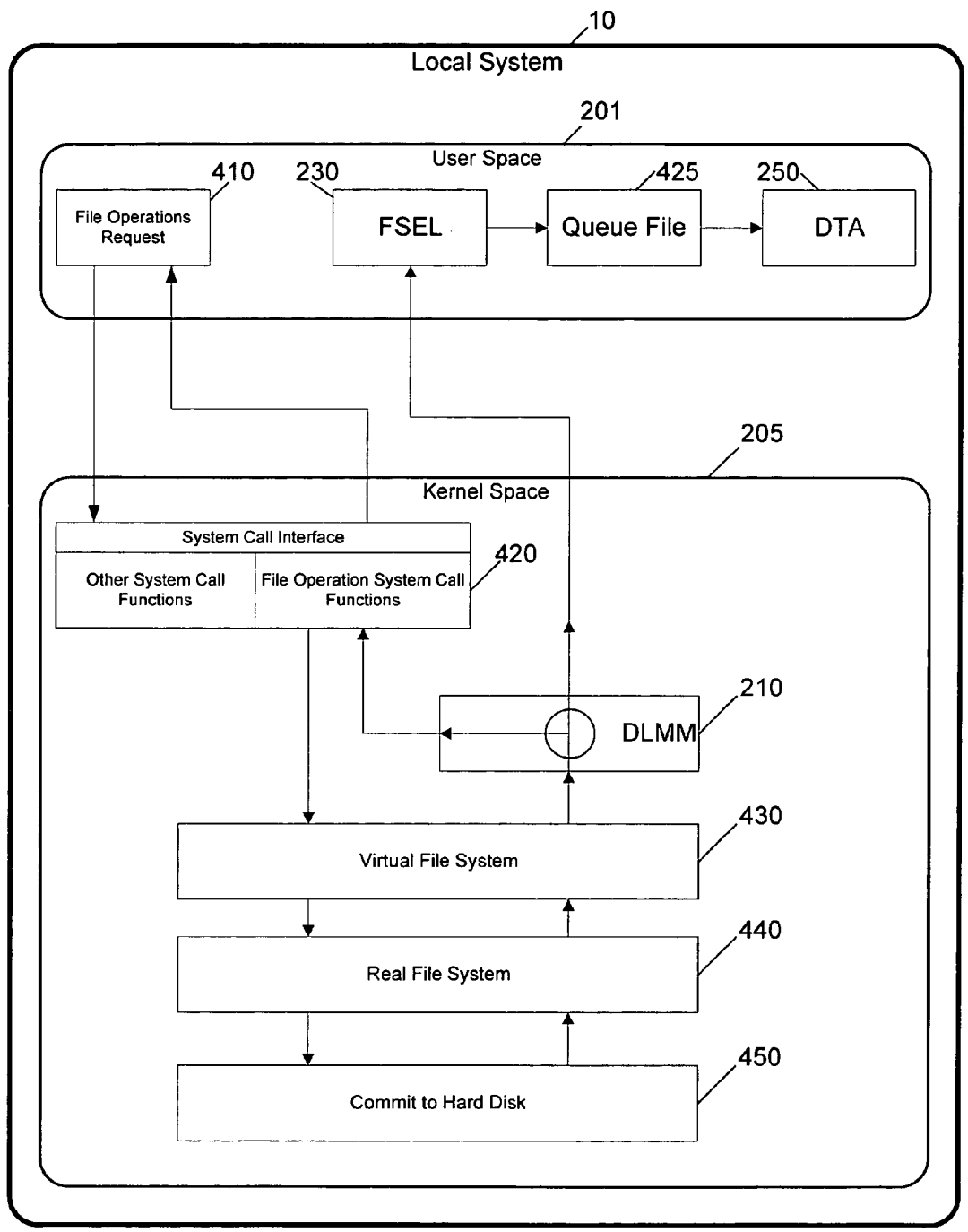
FIG. 3 is a block diagram of the DLMM, which represents the method of how the file system can capture and log events that are of interest and how to facilitate the mirroring process of according to one embodiment of the invention.

The MMA 200 then invokes the File System Event Logger (FSEL) 250 daemon or process. The FSEL 230 is designed to be as fast as possible and consists of one primary operation. The FSEL's 230 purpose is to receive data from the DLMM 210 and commit that data to the queue file. The FSEL 230 enters its main loop and goes to sleep awaiting information from the DLMM 210. In one embodiment, the FSEL 230 and DLMM 210 make up the first level of the present invention, as shown in FIG. 3.

The MMA 200 then invokes the Data Transfer Agent (DTA) 250 daemon or process. The DTA 250 reads its required configuration data via the configuration file. In one embodiment, the configuration data required by the DTA 250 includes the information contained in the Partners field, the Prioritization field, the Threads field, and the Auth_string field of the configuration file.

The above information is stored in the DTA 250 as global variables.

If the configuration file states that the local machine will also be receiving data from other mirroring partners, the MMA 200 invokes the Data Receive Agent (DRA) 270 daemon or process. The DRA 270 reads its required configuration data via the configuration file. In one embodiment, the configuration data required by the DTA 250 may include the information contained in the Auth_string field and the Allowed_clients field of the configuration file 100.

The above information is stored in the DRA 270 as global variables.

The DTA 250 and the DRA 270 (the DRA 270 running on a geographically remote system) make up the data transfer part of the present invention. The DTA 250 along with the DRA 270 work together in order to keep the systems synchronized. FIG. 4 shows an overview of the entire process of communication between the DTA 250 and DRA 270 on two geographically remote data storage systems.

Once all the required parts of the data transfer system have been initialized and are running, the MMA 200 starts the mirroring process by setting a Boolean variable inside the DLMM 210 to true or one via an ioctl call to the DLMM 210.

Figure 5:
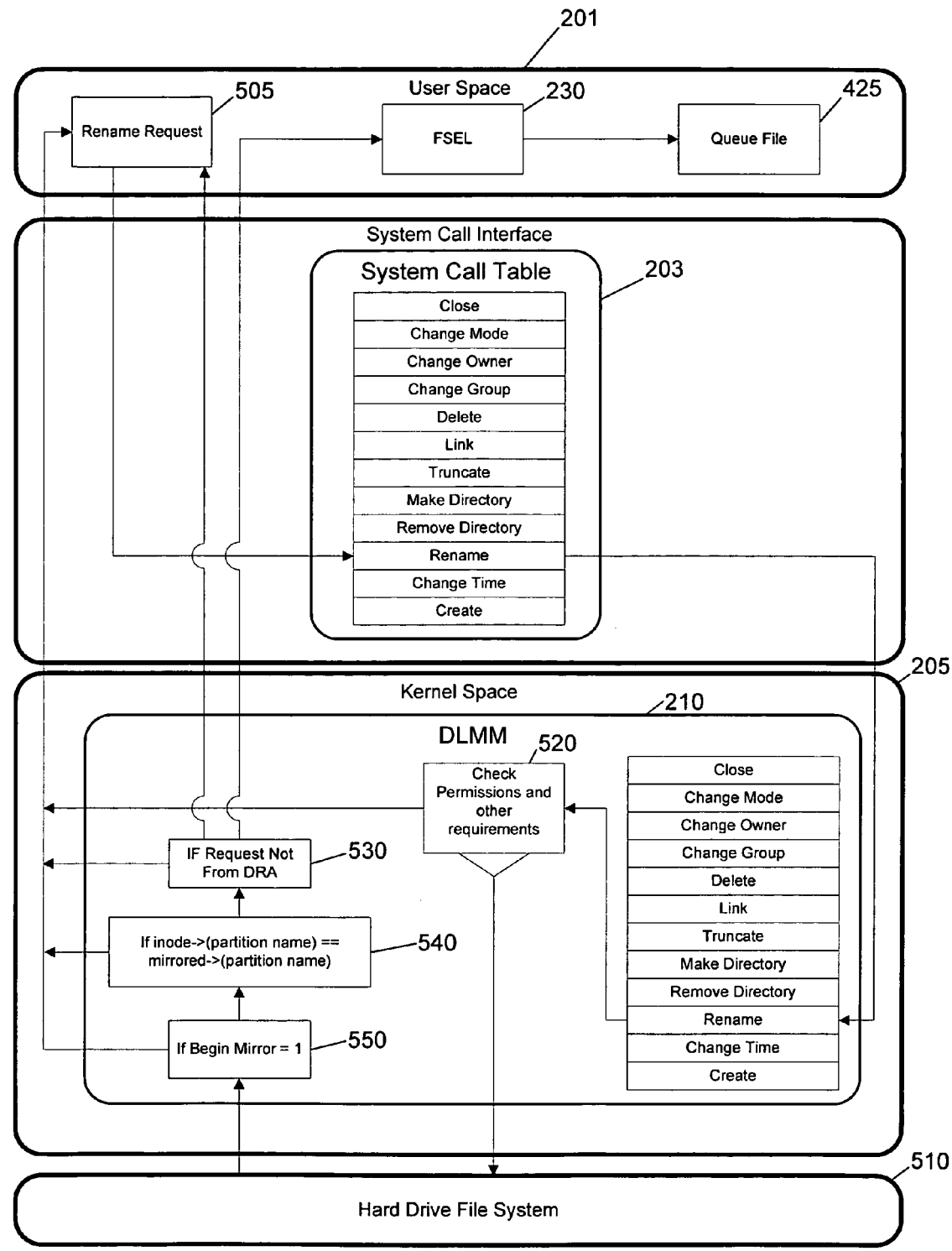
FIG. 5 is a diagram showing one embodiment the first part of the invention, describing how the FSEL 230 and DLMM 210 work together on the first half of the mirroring process.

After the initialization process is complete, any further file operation requests that correspond to the above mentioned function calls will now be routed through the DLMM 210, as shown in FIG. 5. When a user space application 201 or process dispatches a file operation request (505) to the kernel 205 or file system sub system, the request traverses down through the system and eventually reaches the physical hard disk (510) providing the request (505) has the appropriate associated permissions (520) to complete the current operation. If the request does not have the appropriate permissions the request is terminated and the function call returns with the appropriate error flags or message. In this scenario the DLMM 210 does not interfere with the requested operation, as there is no point in tracking or logging an invalid request. This eliminates the need for complex roll back operation code in the DLMM 210. The DLMM 210 inspects the inode of the file associated with the current file operation request. The inode structure contains the name of the disk partition that the file resides on. The DLMM 210 compares the name of the partition in the inode with the name of the partition to be mirrored. This is the information stored in the partition field of the configuration file that the DLMM 210 received from the MMA 200 during the initialization phase.

Pseudo code example:
if (inode->(partition name)==mirrored->(partition name)) {
Do further checks
} else {
Do Nothing
}

If the value of the partition name variable stored in the inode is equal to the value of the partition name variable in the DLMM 210, this is an indication that the file resides on the partition that is to be mirrored/transferred. Therefore, the file name along with the event i.e. write, delete, rename etc. should be sent to the FSEL 230 and logged.

(When the configuration file states that the entire system should be mirrored/transferred, every file that is altered will be logged and mirrored except for the files that reside under the directories that are listed in the Exclude_dir field of the configuration file.)

Figure 6:
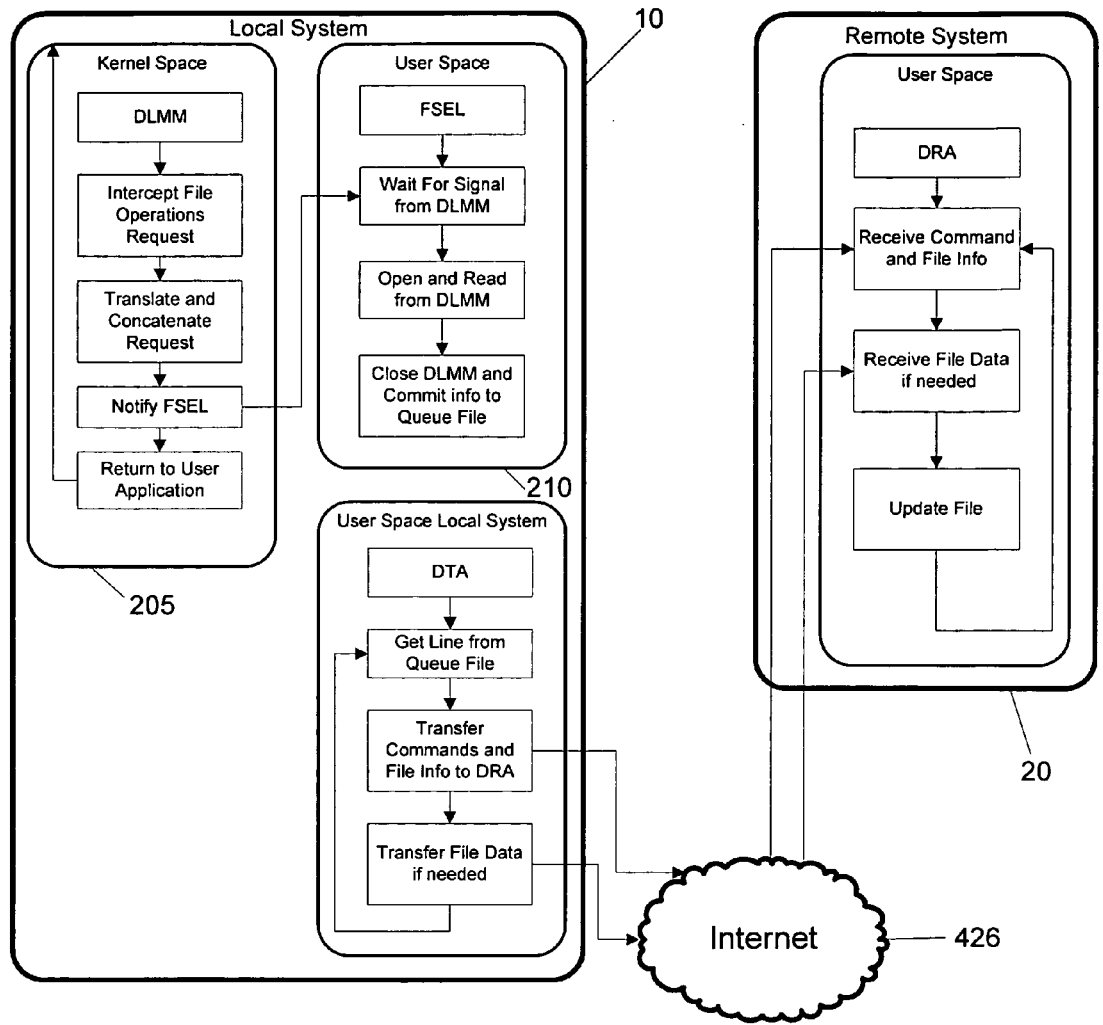
FIG. 6 is a block diagram that describes the format of the queue file and how the file system events are interpreted and logged according to one embodiment of the invention.
Figure 6:
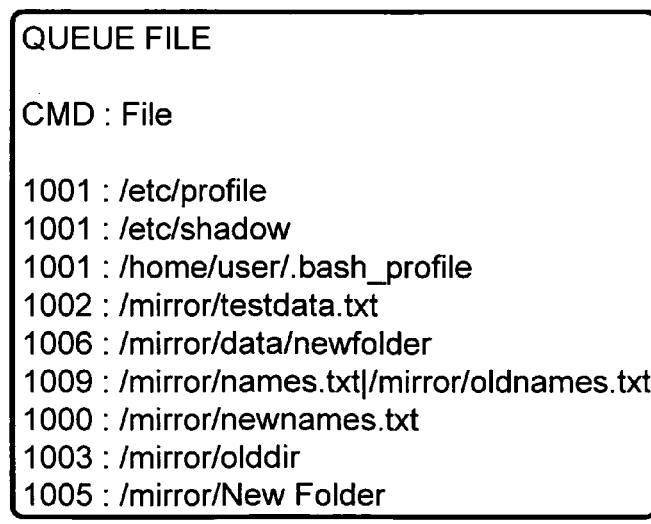

The full path to the file and an integer representation in a text string format of the current file operation being performed are concatenated together in a buffer (610) inside the DLMM 210. FIG. 6 illustrates an example of a full command string.

The scheduling priority of the FSEL 230 is raised by the DLMM 210 as to be the next process to run. A signal is then sent to the FSEL 230 specifying that there is data waiting to be written to the queue file 425. The FSEL 230 is awakened by the signal sent from the DLMM 210 and opens the DLMM 210 as a file and copies the information that is in the DLMM 210 buffer to a user space 201 buffer within the FSEL 230. The FSEL 230 closes the DLMM 210 file and then opens, locks and writes the information to the queue file 425. If the queue file 425 does not exist then it is created. There is no need to queue or track the actual data being written to disk.

Upon successful completion of the write operation to the queue file 425, the FSEL 230 closes the queue file and returns to the main loop and goes back to sleep (702) awaiting the next signal from the DLMM 210.

Figure 7:
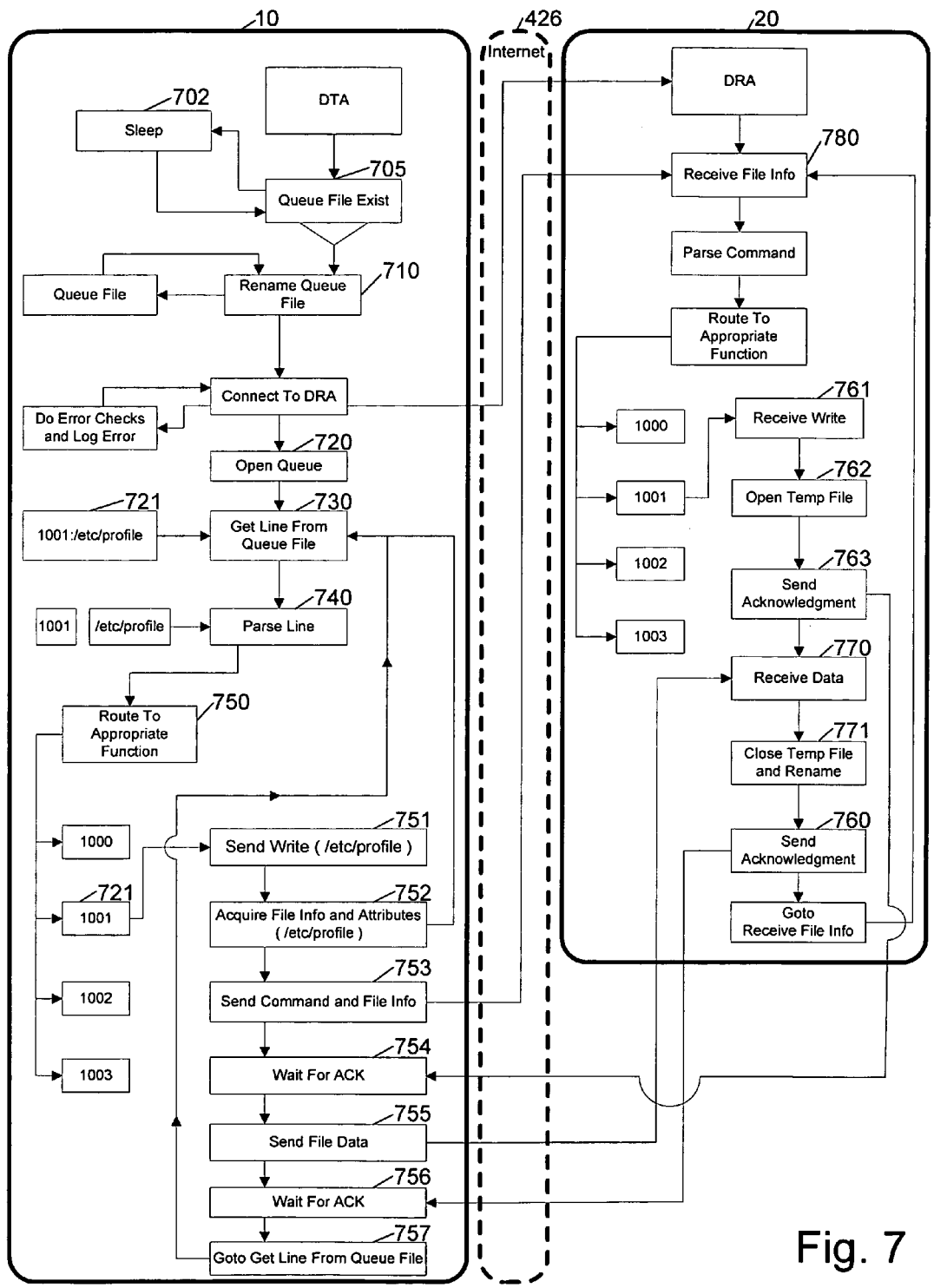
FIG. 7 is a block diagram showing the DTA 250 and DRA 270 operation functions which comprises an embodiment the mirroring process.

In one embodiment, the DTA 250 checks, once a second to see if a queue file 425 exists (705) and that the size of the file is greater than zero, as shown in FIG. 7. If the queue file 425 exists, the DTA 250 attempts to rename the file in a loop until it is successful. There may be an exclusive lock placed on the queue file by the FSEL 230 and therefore the DTA 250 may have to try multiple times to rename the queue file.

As stated, the queue file contains one command string per line (610). Each command string takes the form of:
(COMMAND): (/PATH)
Example:
1001:/etc/rc.d/firewall
1001=a write event /etc/rc.d/firewall=the file that was written to 1003:/home/user/desktop 1003=make directory /home/user/desktop=the path and the name of the directory FIG. 7 illustrates the DTA 250 opens the renamed queue file 425 and initiates the transfer process. In one embodiment, the first step is to prioritize the information in the queue. Each type of event or command in the queue file has an associated synchronization priority value. The events that have the highest priority value are processed first. A list of each command and the associated synchronization value follows: MAKE DIRECTORY=10, RENAME DIRECTORY=9, WRITE=8, RENAME FILE=7, CREATE=6, CHANGE OWNER=5, CHANGE MODE=4, LINK=3, TRUNCATE=2, DELETE=1, REMOVE DIRECTORY=0. All entries are processed starting from the highest priority to the lowest priority. All duplicate entries are also removed if multiple like commands exist for the same file. For example, if two (2) write commands in the queue file are associated with the same file, there is no need to process both entries. Both commands would be logically combined into one command, i.e., combining like terms. In one example, of implementing prioritization, a file system event that equates to the creation of a new directory has a higher priority in the synchronization process than would a file system event that equates to the deletion of a directory even though the deletion of a directory occurred first on the sending system. Similarly, the deletion of a file has a lower priority in the synchronization process than does the renaming of a file. Writing to a file has a higher priority in the synchronization process than the renaming of a file. The creation of a directory has the highest priority in the synchronization process higher than any other request because no files can be transferred to a directory that does not exist at the receiving end. Sending all the highest priority commands to the receiving system first, rather than sending them in order of occurrence, allows multiple communications threads to be spun off. By doing this, potential data transfer bottlenecks are avoided. For example, if a 100-megabyte file must be transferred to the receiving system, a single thread can be spun off to handle just that file, while other much smaller files that may take less than a second to transfer can be sent by another thread. This is critical on low speed networks because the transfer of small amounts of data does not have to wait for the completion of the transfer of a single large file to the receiving system. The result is a queue file containing information that has been reordered to allow certain information to be sent first to the remote system. Furthermore, duplicate event entries corresponding to the same file have been eliminated.

There may be instances where a user may not wish that the information in the queue file 425 is prioritized. Therefore, the prioritization is available as an option to be set inside the configuration file 100. If the configuration file states that a queue file should not be prioritized, then the above prioritization process will be skipped.

The next step in the transfer process for the DTA 250 is to parse the command portion of the command string (740). The command portion of the command string is used to route the path portion of the command string to the appropriate function (750) that handles that particular event.

For example, the command '1001', (721), which equates to a write event would be used to route the path portion of the command string to the send-write( ) function. The send-write( ) function (751) will handle the rest of the data transfer process for this file. The send-write( ) function accepts only one argument, a character string pointer. This argument contains the path portion of the command string. The send-write( ) function uses the path portion of the command string to acquire the file's statistical information through the use of a stat function call. The stat function call is part of the ANSI C standard and is well known to those of ordinary skill in the art. If by chance the file has been deleted prior to this, the stat call returns 0 in which case the send-write( ) function also returns 0 and the DTA 250 moves on to the next command in the queue file. The next step checks if the global Boolean prioritization variable has been set to one (1) or true. If it has, and the size of the file is greater than the line speed divided by 8 multiplied by 30 (size>ₑLine Speed/8)*30) (indicating that the file will take longer than 30 seconds to transfer) then the send-write( ) function will spin off a thread to handle the rest of the data transfer process for this file. This allows the DTA 250 to move on to the next command string in the queue. In one embodiment, threads will continue to be spun off until the maximum number of allowed threads has been reached. The maximum number of allowed threads is set inside the configuration file 100. Only operations that require the transfer of file contents are affected by the prioritization variable and subsequently spin off a communications thread. Other commands that only require the transfer of the file's statistical information are not affected by the prioritization variable and therefore do not spin off a communications thread.

If the above stat function call is successful (752), the information contained in the stat structure along with the command (1001 in this case) and the path to the file (obtained from the char string passed as an argument) are concatenated into one buffer and sent (753) to the remote computer running the DRA 270.

The preferred response from the DRA 270 is an acknowledgment (763) of receipt of the file information from the DTA 250 and that the DTA 250 can now proceed. This preferred response from the remote computer running the DRA 270 indicates the following:

a) The file information has been received (761)

b) The path to the file exists;

c) A temporary file has been opened (762); and d) Ready to receive the file data.

At this point the DTA 250 opens and locks the file and begins the actual transfer of the file data (755). The DRA 270 reads the file data (770) as it arrives and writes it to a temporary file to preserve the integrity of the original file. Once all the data arrives at the remote computer, the DRA 270 closes the temporary file, renames the file to the correct name and sets all the file attributes that the DRA 270 received at the start of the communications process, i.e., owner ship, access permissions, etc (771). The DRA 270 then sends an acknowledgment (760) back to the DTA 250 confirming that the operation has completed successfully. When the DTA 250 receives the acknowledgment from the DRA 270 that the file was successfully updated, the DTA 250 unlocks and closes the file. This constitutes a full transaction between the DTA 250 and the DRA 270 running on a remote system.

If there are more commands (757) to be sent in the queue file, the DTA 250 proceeds using the same method as described above.

The following is the list of commands and the required information that may be sent to the remote system:

a) 1000=create (command:inode:path);

b) 1001=write (command:inode:path:data);

c) 1002=delete (command:path);

d) 1003=Change Mode (command:inode:path);
e) 1004=change owner (command:inode:path);
f) 1005=rename (command:inode:oldpath|newpath:data);
g) 1006=make directory (command:inode:path);
h) 1007=remove directory (command:path);
i) 1008=truncate (command:inode:path:data);
j) 1009=link (command:inode:sourcepath|linkpath)
k) 1010=rename directory (command:inode: oldpath|newpath);

In one embodiment, the write, rename and truncate commands are the only commands that require the actual file data to be transferred (755) to the DRA 270 at the remote system along with the file's statistical information. The rest of the commands need only the file's statistical information itself and the command string to be sent (753) to the remote system 20 running the DRA 270, as they are internal file system operations only.

In certain scenarios, the local machine 10 running the DTA 250 and the geographically remote receiving machine 20 running the DRA can be considered to be unsynchronized with one another. If an error occurs, that indicates the loss of a portion or all of the entire mirrored directory structure at the remote system due to a disk error or some other unknown error, the two systems will negotiate the last known good directory on the remote system and then rebuild the directory structure and all of its contents. The local system will then generate an emergency queue file starting at the last known good directory that contains the names of all missing directories and files. After that the local system will spin off a special communications thread that will handle the transfer and subsequent rebuilding of the directory structure on the remote system starting at the last known good directory. This process is entirely independent of the main mirroring process and thus does not interfere with the main mirroring process. If multiple directory trees have been lost, then multiple emergency queues and subsequent threads will be used to automatically rebuild the lost directory trees.

For example, if the local system sends a write command to the remote system 20 (1001:/mirror/home/user/kelder/profile), the remote system 20 will attempt to open a temporary file underneath the directory path that it received from the sending system (/mirror/home/user/kelder). If this directory does not exist, an error will occur stating that the path does not exist. The remote system 20 will then parse out the path it received in an attempt to locate the last good directory. The remote system 20 will parse the path string starting from right to left and proceed to check the existence of each directory in the path string until it finds a matching directory. Once the remote system finds the last known good directory, it will send this path along with an error message back to the sending system. The sending system will generate a directory listing starting at the path it received from the remote system and sends this directory listing back to the remote system along with the statistical information for each directory in the list. At this point the write operation that previously failed can now proceed normally. After the current write operation completes, the sending system will spin off a communications thread to handle the rebuilding of all the files that were contained underneath the lost directories on the remote system. This thread will create a listing of all the files underneath the lost directories starting at the last known good directory that the sending system received from the receiving system and add these file names to an emergency queue file. The thread will then proceed to send the files listed in the emergency queue file to the remote system using the above described write operation procedure. A new connection to the remote system separate from the main DTA 250 process will be used to send all the lost files and their contents and will not interfere with the main mirroring operations. The above described re-synchronization process will also work for the initial synchronization of local 10 and remote systems 20.

Figure 8:
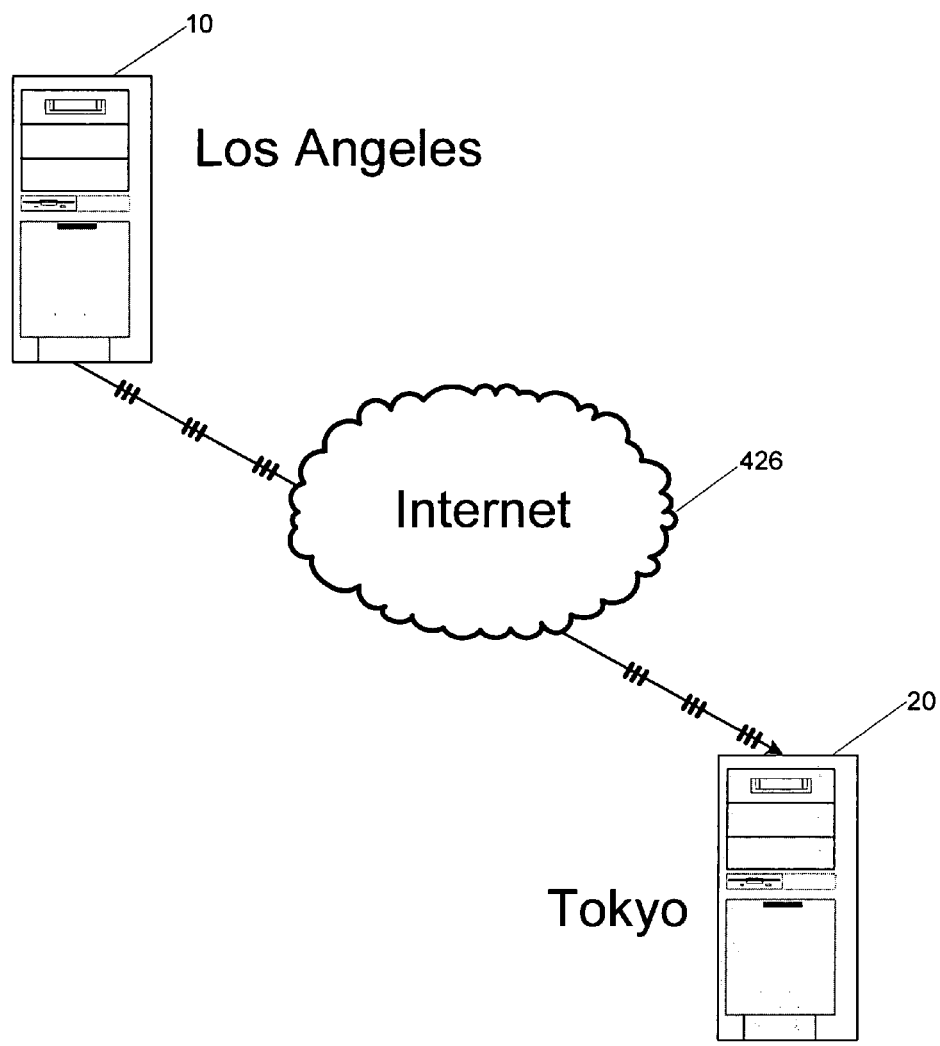
FIG. 8 is a diagram showing two geographically remote data storage systems utilizing the Internet 426 for remote backup according to one embodiment of the invention.
Figure 9:
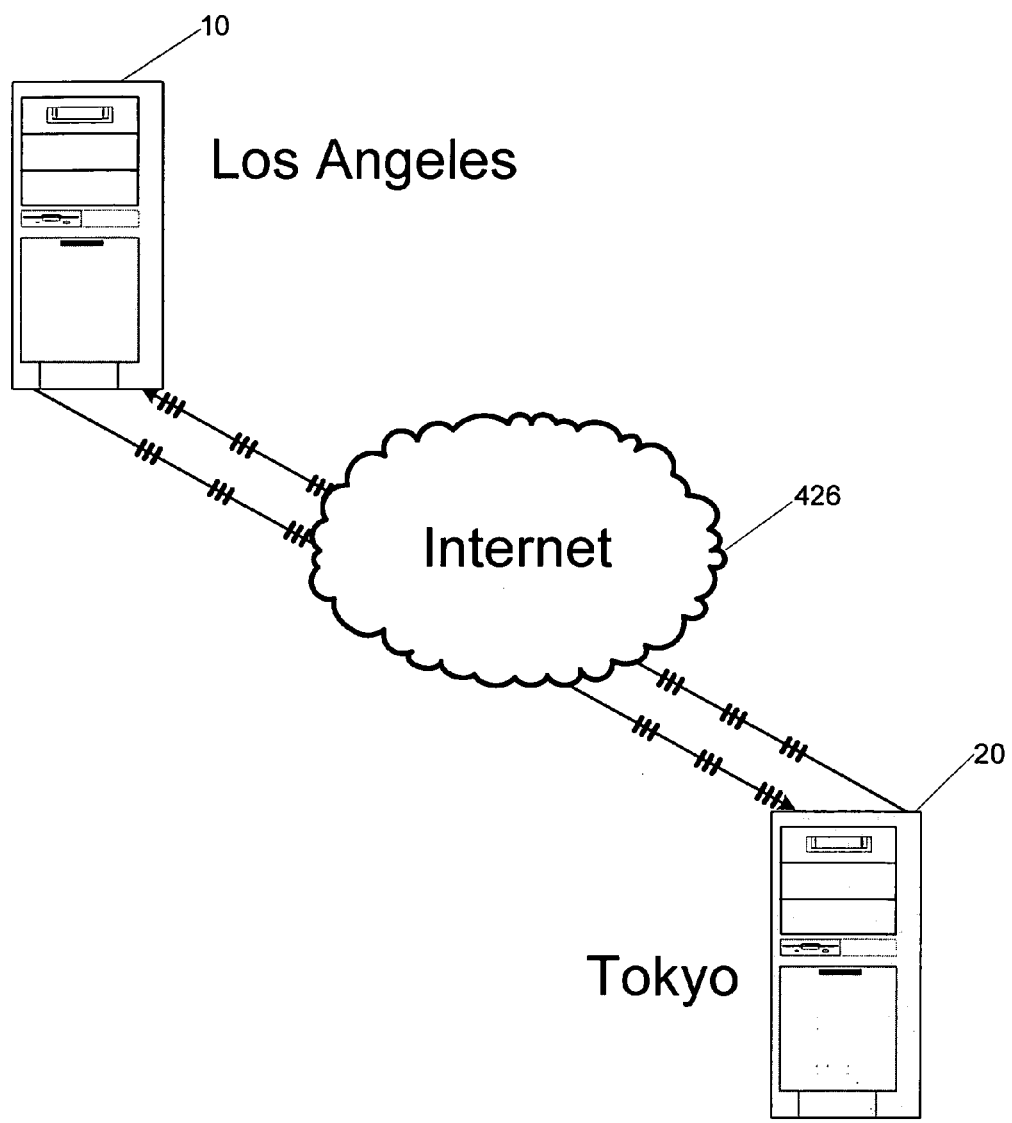
FIG. 9 is a diagram showing two geographically remote data storage systems which synchronize/replicate data across the Internet 426 according to one embodiment of the invention.

In case of a catastrophic failure of a hard drive or other local storage facility the locally lost data needs to be transferred from the remote system back to the local system after replacement of the defective local storage media. A user can invoke a re-synchronization utility on the remote data storage system to send all data either starting from a specified path provided to the re-synchronization utility via a command line argument or from the field called 'partition' in the configuration file if no specific command line argument is provided. The re-synchronization utility parses through the directory tree starting from the specified path argument. Through the prioritization technique described above where the creation of directories has the highest priority the directory information is sent and rebuilt first. After the rebuilding of the directory tree is completed the actual file data is send. Multiple threads can be used while sending the data to minimize the transfer time for a given line speed. The here described procedure works for the remote backup as shown in FIG. 8 and for the two-way mirroring as shown in FIG. 9.

It should be understood that the embodiments of the herein described invention may be used on a general purpose and specific-purpose computer system having a) A data storage system or electronic data processing devices capable of storing, updating & retrieving data at the local level in a non-volatile method, i.e., memory module, hard disk, virtual hard disk, raid array etc.; b) A non-specific network interface card or device, enabling network communications, i.e. Ethernet, infrared, ATM, spread spectrum; and c) A receiving device in accordance with a) and b) above.

For example, the electronic data processing devices can be in form of an IBM compatible PC, Main Frame, Palm Pilot or other hand held devices, or any device that has the ability to store and retrieve non-volatile data. This invention requires no specific/dedicated hardware or additional devices for normal operations. In one embodiment, the operating system should have the ability to load and unload dynamically any device drivers or modules.

It should be understood that the system as herein described can alleviate the need for an organization to do manual tape based backups each evening. At the very moment when file contents, or file attributes are changed, the mirroring process begins for that particular file. The name of the file and the file system event that occurred, are placed in a queue awaiting transfer to the receiving system. The modified or newly created files are then transferred to the remote system. The system also has the ability to do nightly backups of the entire system automatically and send this backup wherever the user or system administrator chooses, all without any further user intervention. The user or system administrator no longer has to worry about changing tapes every night. This also eliminates the worry that a tape may be physically bad, therefore rendering that backup for the evening useless, or the need to keep a complex catalogue system for the tapes, and the possibility that someone forgets to place the tape into the tape drive.

It should be appreciated that in case of catastrophic loss of data on the local host system 10, the data from the backup system 20 (as shown in FIGS. 8 and 9) can easily be used to restore the local host system, by inverting the data transfer direction back to the local host system. Since this system has the ability to mirror information in both directions, as shown in FIG. 9, the process of restoring data easily from one system to another, is inherently built into the system by its very design. No longer does a user or system administrator have to manually retrieve backup tapes from a geographically remote location in order to facilitate an entire or partial system rebuild. During ongoing data recovery a user is able to access data that has been already restored onto the local system even though the data recovery process is not completed, yet. Furthermore, it is possible to choose the directories, which should be restored first allowing an even faster access to mission critical data.

It should be understood that similar to the data backup feature, this system can mirror data in both directions between a local system and one or more geographically remote systems, across local area networks (LANs), metropolitan area networks (MANs), wide area networks (WANs) and across standard internet connections such as DSL, cable modem, T1, T3 and electromagnetic wave based communication networks, such as, Laser, spread spectrum, microwave, infrared, etc. thus providing the exact same data at different sites for user access. This way, identical copies of the same data are accessible at different locations. Users can modify the data at any location and the modified data is then automatically mirrored to all or selected remote locations.

It should be understood that embodiments of this invention has the capability to automatically re-synchronize an entire directory structure and its contents without interruption to the mirroring process. In case an error occurs, such as the partial or total loss of the mirrored directory structure at the remote system due to a disk error the invention will be able to automatically and fully re-synchronize both systems as long as the error is not due to a fatal hardware failure. The two systems will negotiate the last known good directory on the remote system and then rebuild the directory structure and all of its contents. The local system will then generate an emergency queue that contains the names of all the directories and files. After that the local system will spin off a special communications thread that will handle the transfer and subsequent rebuilding of the directory structure on the remote system starting at the last known good directory. This process is entirely independent of the main mirroring process and thus does not interfere with the main mirroring process. If multiple directory trees have been lost, then multiple emergency queues and subsequent threads will be used to automatically rebuild the lost directory trees and their contents.

It should be understood that prior to the transfer of data, the system generates a calculated CRC (Cyclic Redundancy Check) value on the data, and sends this CRC value along with the data so the integrity of the data can be verified by the receiving system. If the CRC values do not match, the sending system is notified of this fact and the sending system resends the data.

It should be understood that embodiments of the software works on standard X86 based PC components, well known to those of ordinary skill in the art, without any additional dedicated or specialized hardware. In this way, there is no requirement for dedicated high speed, high cost fiber-optic connections, as the system will work on any type of communications network. The system is also designed so that an average user or system administrator can configure and maintain the system with ease eliminating the need for highly trained technical personnel.

It should be understood that the system can mirror data between two or more dissimilar data storage devices. Mirroring different types of storage media such as RAID array (Redundant Array of Inexpensive Disks), SCSI disk, floppy disk, IDE disk, tape drives and memory modules is not a functional limitation of this system. Essentially, the system can mirror data that is stored on any data storage device, which can be accessed via standard file operation function calls.

It should be understood that the mirroring process can be optimized through prioritization of the contents in the queue file allowing for a streamlined transfer of data between the local and remote systems. This prioritization allows transferring data in a non-sequential manner. Selected duplicate entries in the queue file can be eliminated and multiple transfers of the same file can be combined into only one transfer thus reducing the total amount of data transferred. It should be understood that other varying prioritization techniques, well known to those of ordinary skill in the art, might also be used to select an entry from the queue file to be transferred and the invention is not limited to the technique described herein. Each technique is not shown here, as to not obscure the description of embodiments of the invention.

It should be understood that multiple communications threads can be used to speed up the transfer of data. This way, the entire bandwidth of the network connection can be efficiently used for mirroring and/or backup purposes.

What is claimed is:

1. A machine-readable medium having a set of instructions to cause a machine to perform a non real-time method for transferring data to a mirrored file system comprising:
   receiving one or more indications of file system events on a first file system on a first server;
   saving the indications of the file system events entries in a queue file, each entry including a file system command associated with each file system event;
   prioritizing the entries in the queue of a non real-time system based on a synchronization priority value associated with each entry;
   identifying entries that relate to the same data; and
   sending a latest entry regarding that data of the entries in the queue file to a second server via a first communications thread over a network.

2. The machine-readable medium of claim 1, wherein the sending further comprises sending a data file related to a write file system command associated with one of the prioritized entries to the second server via a second communications thread.

3. The machine-readable medium of claim 1, further comprising removing duplicate entries of the file system commands from the queue file.

4. The machine-readable medium of claim 1, wherein saving the indications of the file system events as entries in the queue file further comprises determining whether to save each indication of the file system events to the queue.

5. The machine-readable medium of claim 1, wherein prioritizing the entries in the queue file further comprises prioritizing a make directory file system command as the highest prioritized entry.

6. The machine-readable medium of claim 1, wherein sending further comprises sending each prioritized entry of the processed file system commands to the second server upon determining whether the second server is ready.

7. The machine-readable medium of claim 1, wherein sending further comprises sending each entry of the file system commands to the second server.

8. A computer system comprising:
   a Dynamically Loadable Mirroring Module (DLMM) to intercept one or more file system commands to a file system;

a File System Event Logger (FSEL) to store the file system commands as entries in a queue of a non real-time system; and a Data Transfer Agent (DTA) to prioritize the entries in the queue file based on a synchronization priority value associated with each entry and to send the file system commands from the queue file to a remote file system via a first communications thread over a network, wherein the DTA sends a latest entry from the queue that relates to the same data to the remote file system.

9. The system of claim 8 further comprising a Data Receive Agent (DRA) to receive the file system commands on the remote file system.

10. The system of claim 8, wherein the DTA priorities each entry related to a write file system command based on the size of a data file to be sent.

11. The system of claim 10, wherein the DTA sends the data file via a second communications threads.

12. The system of claim 8, wherein the DTA further removes duplicate file system command entries from the queue file.

13. The system of claim 8, wherein the DTA sends the file system commands and the DRA receives the file system commands via an Internet communications connection.

14. The system of claim 13 wherein the communications connection is authenticated via an auth_string.

15. A computer system comprising:

a file system command intercepting means to intercept file system commands made to a file system, the file system means to generate an entry for each intercepted file system command describing the intercepted file system commands to a buffer of a non real-time system;

a prioritization means to prioritize the entries in the buffer based on a synchronization priority value associated with each entry; and a transfer means to transmit a latest entry in the buffer relating to a same data to a remote file system over a network.

16. The system of claim 15, wherein the prioritization means is to prioritize the transfer of a data file based on the size of the data file.

17. The system of claim 16, wherein the transfer means sends the data file via a second communications threads.

18. The system of claim 15, wherein the prioritization means to remove duplicate file system command entries from the buffer.

19. The system of claim 15 further comprising:

a selecting means to select the file system commands to be intercepted by the intercepting means to be placed in a buffer.

* * * * *

UNITED STATES PATENT AND TRADEMARK OFFICE
CERTIFICATE OF CORRECTION

| | | |
|---|---|---|
| PATENT NO. | : 7,047,377 B2 | Page 1 of 1 |
| APPLICATION NO. | : 10/225103 | |
| DATED | : May 16, 2006 | |
| INVENTOR(S) | : Kevin Elder and Oliver Hemmers | |

It is certified that error appears in the above-identified patent and that said Letters Patent is hereby corrected as shown below:

On the title page: Item [54] and Column 1,
"FLEXIBLE REMOTE DATA TRANSFER AND DATA SYNCHRONIZATION"

Signed and Sealed this

Eighth Day of August, 2006

JON W. DUDAS
*Director of the United States Patent and Trademark Office*